(12) United States Patent
Belmonte et al.

(10) Patent No.: US 8,616,853 B2
(45) Date of Patent: Dec. 31, 2013

(54) STATOR VANE FOR 3D COMPOSITE BLOWER

(75) Inventors: Olivier Belmonte, Perthes en Gatinais (FR); Jean Noel Mahieu, Paris (FR); Xavier Millier, Saint Mery (FR)

(73) Assignee: SNECMA, Paris (FR)

( * ) Notice: Subject to any disclaimer, the term of this patent is extended or adjusted under 35 U.S.C. 154(b) by 529 days.

(21) Appl. No.: 13/003,436

(22) PCT Filed: Jul. 9, 2009

(86) PCT No.: PCT/FR2009/051363
§ 371 (c)(1),
(2), (4) Date: Jan. 10, 2011

(87) PCT Pub. No.: WO2010/004216
PCT Pub. Date: Jan. 14, 2010

(65) Prior Publication Data
US 2011/0110787 A1 May 12, 2011

(30) Foreign Application Priority Data

Jul. 10, 2008 (FR) .................................... 08 54702

(51) Int. Cl.
*F04D 29/38* (2006.01)
*F01D 5/14* (2006.01)
(52) U.S. Cl.
USPC ........ 416/230; 416/241 A; 415/191; 415/200; 29/889.21; 29/889.71
(58) Field of Classification Search
USPC .......... 416/229 R, 230, 241 R; 415/191, 197, 415/200, 208.1; 29/889.21, 889.71
See application file for complete search history.

(56) References Cited

U.S. PATENT DOCUMENTS 3,632,460 A 1/1972 Palfreyman et al.
4,363,602 A * 12/1982 Martin ........................ 416/230
(Continued)

FOREIGN PATENT DOCUMENTS

EP 1 526 285 4/2005
EP 1 777 063 4/2007

OTHER PUBLICATIONS

U.S. Appl. No. 13/141,852, filed Jun. 23, 2011, Marsal, et al.
(Continued)

*Primary Examiner* — Igor Kershteyn
(74) *Attorney, Agent, or Firm* — Oblon, Spivak, McClelland, Maier & Neustadt, L.L.P.

(57) ABSTRACT

A method of fabricating a guide vane. The method produces a fiber preform by 3D weaving a single piece, the preform including a first portion extending along the longitudinal axis and constituting the preform for an airfoil of the vane, and at a longitudinal end of the first portion, a second portion constituting the preform for the platform of the vane, the second portion being produced as a first layer and a second layer facing the first layer and separated from the first layer by unlinking without cutting while producing the preform; folding the first and second layers such that each of them lies in a plane perpendicular to the longitudinal axis, substantially symmetrically to each other relative to the first portion, and such that a first region of the first layer covers a second region of the second layer in front of a front edge of the first portion; conforming the preform in a mold; and densifying the preform with a polymer matrix.

13 Claims, 9 Drawing Sheets (56) References Cited

U.S. PATENT DOCUMENTS

| | | | |
|---|---|---|---|
| 5,222,297 A * | 6/1993 | Graff et al. | 29/889.71 |
| 5,279,892 A * | 1/1994 | Baldwin et al. | 416/230 |
| 5,672,417 A * | 9/1997 | Champenois et al. | 416/230 |
| 6,056,838 A * | 5/2000 | Besse et al. | 416/230 |
| 6,555,211 B2 * | 4/2003 | Moody | 428/218 |
| 6,746,755 B2 * | 6/2004 | Morrison et al. | 428/166 |
| 7,153,464 B2 * | 12/2006 | Millard et al. | 264/317 |
| 2005/0084377 A1 | 4/2005 | Dambrine et al. | |
| 2006/0257260 A1 | 11/2006 | Dambrine et al. | |
| 2006/0283014 A1 | 12/2006 | Subramanian et al. | |
| 2007/0092379 A1 | 4/2007 | Coupe et al. | |

OTHER PUBLICATIONS

International Search Report Issued Nov. 16, 2009 in PCT/FR09/051363 filed Jul. 9, 2009.

* cited by examiner

STATOR VANE FOR 3D COMPOSITE BLOWER

The present invention relates to a method of fabricating a guide vane (an outlet guide vane/inlet guide vane (OGV/IGV)).

In structures where a saving in weight is desirable, e.g. in a turbomachine, guide vanes (e.g. a fan guide vane, a low pressure guide vane) are made of composite materials having a polymer matrix reinforced by fibers such as carbon, glass, or Kevlar® fibers. Such composite materials are of density that is significantly less than that of the light alloys commonly used and they provide better mechanical performance (in terms of stiffness, and resistance to breakage).

More recent composite materials are made by producing a 3D fiber preform, i.e. by weaving or braiding fibers in three dimensions. Such a preform is subsequently densified with a polymer so as to make a finished composite part, in which the yarns of the preform are embedded within a solid polymer matrix.

One known technique for performing such densification is for example impregnation by a liquid: a distinction is drawn between infusion and injection.

In the infusion technique, the preform is placed between a mold half and a sheet, a polymer chemical precursor in the form of a liquid is then injected from one side into the preform, while a vacuum is established between the mold half and the sheet. Under the action of the vacuum, the precursor diffuses throughout the preform and is then polymerized by heat treatment so as to solidify it. In the injection technique, the preform is placed in a mold and then the liquid precursor is injected into the mold via a plurality of points in order to fill the mold, and is subsequently polymerized by heat treatment, a technique known as resin transfer molding (RTM).

Another known technique for densifying the preform is chemical vapor infiltration. The preform is then placed in an enclosure into which a gas is admitted that contains a precursor of the polymer. Under pressure and temperature conditions that are established inside the enclosure, the gas diffuses throughout the preform and becomes transformed into polymer on making contact with the fibers of the preform.

Figure 5:
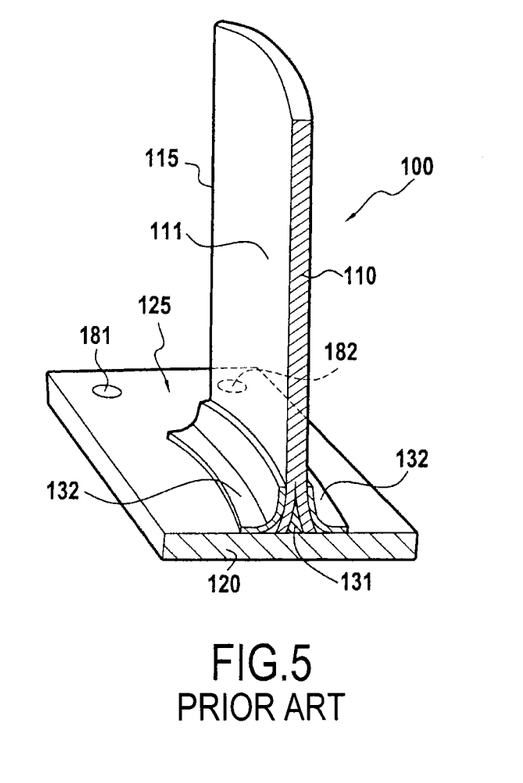
FIG. 5 is a view in perspective and in section of a guide vane of the prior art.

At present, guide vanes are of a structure that does not comprise a single piece, but on the contrary is made up of a plurality of parts that are assembled together. Thus, as shown in FIG. 5, which represents the prior art, a guide vane 100 comprises an airfoil 110 extending radially relative to the main axis of the turbomachine, together with at least one platform 120. The airfoil 110 and the platform 120 are plates or shells of 3D composite material or multilayer composite material (made by stacking pre-impregnated 2D fabrics that are connected together by their polymer matrix). The platform 120 is positioned at a radial end of the airfoil 110, substantially perpendicularly thereto, e.g. at the radially inner end 111. The airfoil 110 may also include a second platform at its radially outer end.

It is necessary to fasten the guide vane 100 securely both at its radially inner end and at its radially outer end. Thus, the platform 120 extends beyond the leading edge 115 of the airfoil 110 in the form of an upstream region 125 that includes holes 181, 182 suitable for receiving mechanical fasteners for securing the vane 100 to a shroud or a casing. The holes 181, 182 are necessarily located in the upstream region 125 since the lack of room between two adjacent guide vanes 100 makes it impossible to place these holes and said fastener between the vanes (i.e. in the portion of the platform 120 that is situated between the leading edge 115 and the trailing edge (not shown) of a guide vane 100).

The airfoil 110 and the platform 120 are two distinct parts. They therefore need to be joined together. The connection between the airfoil 110 and the platform 120 needs to be strong, particularly since this connection forms a right angle and is thus subjected to stress concentration. It is therefore necessary at this connection to fit additional elements such as a core 131, reinforcements 132, and/or inserts as shown in FIG. 5. In spite of this reinforcement, the connection between the airfoil 110 and the platform 120 remains weaker than the remainder of the vane 100 since it is made up of elements that were initially separate and that are assembled together by adhesive, often being made of different materials. Force transmission between the airfoil 110 and the platform 120 is thus poorly ensured. Furthermore, adding these elements requires numerous additional fabrication operations, thereby leading to higher fabrication costs.

The present invention seeks to remedy those drawbacks, or at least to attenuate them.

The invention seeks to propose a method of fabricating a guide vane that is easier, less expensive, and such that the fabricated vane possesses better mechanical strength, in particular at the location where the airfoil joins the platform, and includes a region situated in front of the leading edge of the vane and that is suitable for being fastened to a support.

This object is achieved by the fact that the method comprises producing a fiber preform by 3D weaving a single piece, the preform comprising a first portion extending along the longitudinal axis and constituting the preform for the airfoil of the vane, and at a longitudinal end of the first portion, a second portion constituting the preform for the platform of the vane, the second portion being produced as a first layer and a second layer facing the first layer and separated from the first layer by unlinking without cutting while producing the preform; folding the first and second layers in such a manner that each of them lies in a plane perpendicular to the longitudinal axis, substantially symmetrically to each other relative to the first portion, and in such a manner that a first region of the first layer covers a second region of the second layer in front of a front edge of the first portion; conforming the preform in a mold; and densifying the preform with a polymer matrix.

By means of these arrangements, the vane possesses better mechanical strength since the fiber elements constituting the preform are not cut, specifically at the separation between the first and second layers. Thus, the fiber elements are continuous between the first portion and the second portion and can therefore transmit forces between these two portions. In addition, the overlap between the first and second layers in front of an edge of the airfoil makes the platform stronger and thus the vane stronger, these two layers being connected together by the process of densification with the polymer matrix, and then being suitable for being fastened securely onto a support.

Advantageously, the fiber preform of the first layer is cambered in a zone adjacent to the first portion, and the fiber preform of the second layer is cambered in a zone adjacent to the first portion in such a manner that the zone of the first layer and the zone of the second layer that are adjacent to the first portion tend to take up symmetrical positions on respective sides relative to the first portion under the influence of the cambering.

Thus, a natural camber is imparted to the first and second layers tending to position them in a plane perpendicular to the airfoil, symmetrically relative to the orientation plane of the first portion (airfoil), i.e. in their final position once the vane has been fabricated. This reduces stresses in the fibers when they are placed in the mold prior to the preform being densified with the polymer matrix. This provides a vane having less residual stress generated by its fabrication method.

The invention also provides a guide vane made of composite material and comprising a polymer matrix reinforced by a fiber structure, the vane having a first portion forming an airfoil and a second portion situated at one end of the first portion and forming a platform extending in a plane that is substantially perpendicular to the airfoil.

According to the invention, the fiber structure is characterized in that all of the fiber elements forming the fiber structure are continuous, and in that the region of the fiber structure forming the second portion includes a first layer extending in the plane on one side of the airfoil and in front of a front edge of the airfoil, and a second layer extending in the plane on one side of the airfoil and in front of the front edge of the airfoil substantially symmetrically to the first layer relative to the airfoil, in such a manner that a region of the first layer covers a region of the second layer in front of the front edge of the airfoil.

The invention can be better understood and its advantages appear better on reading the following detailed description of an embodiment given by way of non-limiting example. The description refers to the accompanying drawings, in which.

In the description below, the faces referenced $F_{41}$ and $F_{51}$ designate intermediate faces in the construction of a vane of the invention.

Steps of the method of fabricating a guide vane of the invention are shown diagrammatically in FIGS. 1A, 1B, 1C, 1D, and 1E. The preform 1 is a fiber structure made up of fiber elements. These fiber elements may for example be fibers, tows, or braided microfibers. The fibers may be any reinforcing fiber, e.g. carbon fibers, glass fibers, Kevlar fibers, or a combination of these fibers. In the description below, the preform is produced by 3D weaving of the fibers. Alternatively, it may be produced by 3D braiding of the fibers.

Figure 1A:
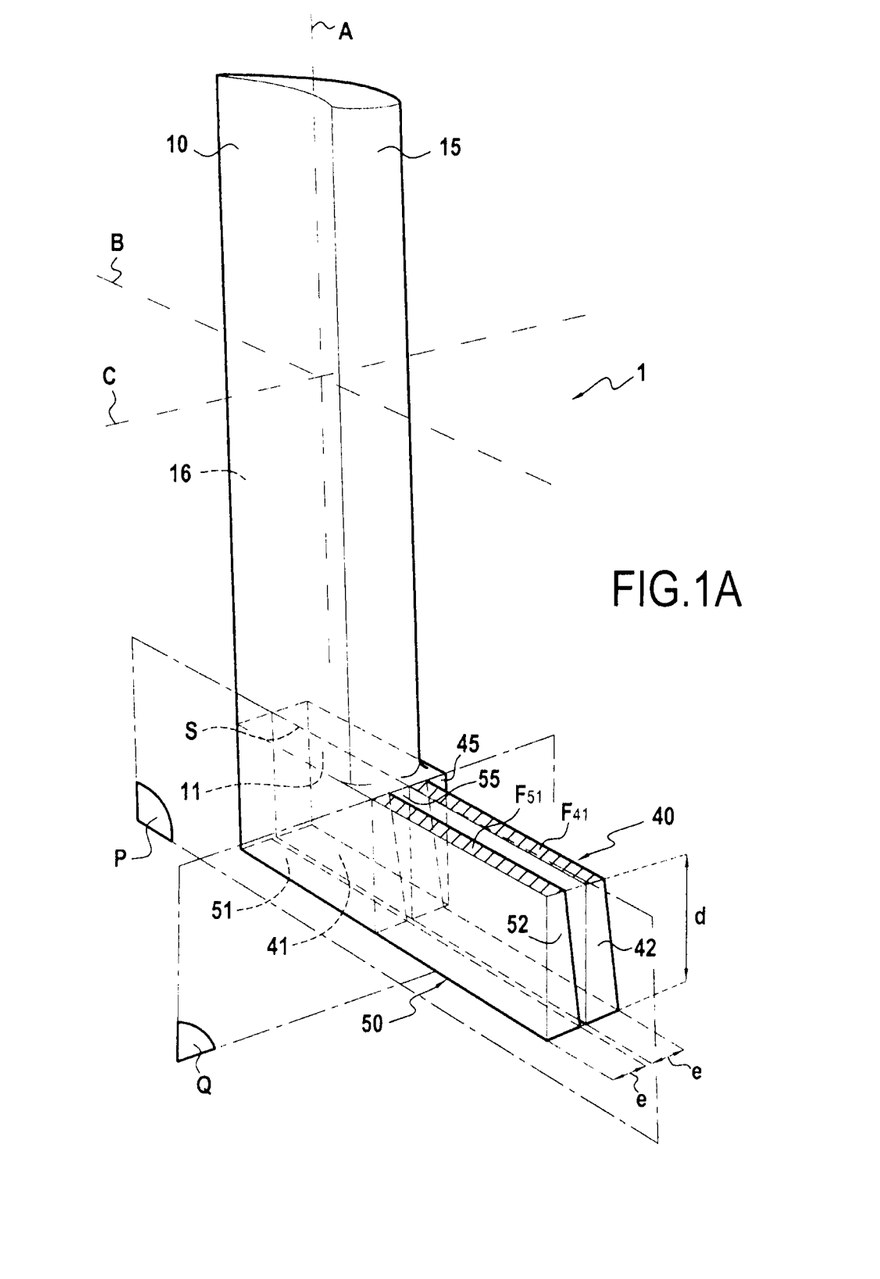
FIG. 1A is a diagrammatic perspective view of the fiber structure of a vane of the invention, while partially constructed.

As shown in FIG. 1A, the preform 1 comprises a first portion 10 for forming the airfoil of the guide vane. The major direction of the first portion 10 extends along a longitudinal axis A, the first portion 10 being of a shape that is slightly curved about the axis A. The width of the first portion 10 extends along a transverse axis B perpendicular to the axis A, and the thickness of the first portion 10 extends along an axis C that is perpendicular to the axes A and B. The thickness of the first portion 10 is small relative to its width and its length, so the first portion 10 is substantially in the form of a curved plate extending substantially in a plane defined by the axes A and B.

The first portion 10 is woven until its length along the axis A is substantially equal to the radial dimension desired for the finished guide vane. The warp yarns (fibers) extend along the axis A, with the weft yarns (fibers) extending along the axis B. The first portion 10 thus extends in the direction of the transverse axis B between a front edge 15 and a rear edge 16. In the direction of the longitudinal axis A, the first portion 10 extends between two longitudinal ends.

Weaving is performed on a Jacquard type loom on which the warp yarns are mounted so as to be oriented along the axis A and to extend over a plurality of layers superposed along the axis C, and in which the weft yarns are oriented along the axis B and define the superposed layers. The shuttle of the loom that carries the weft yarns performs go-and-return movements along the axis B to pass over and under the warp yarns.

Figure 3A:
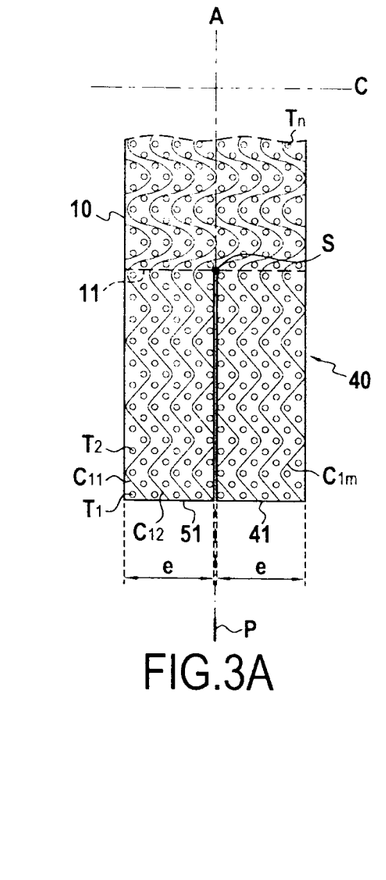
FIG. 3A is a section view on line IIIA-IIIA of FIG. 1B, showing a section of the first portion of the fiber structure of a vane of the invention.
Figure 3B:
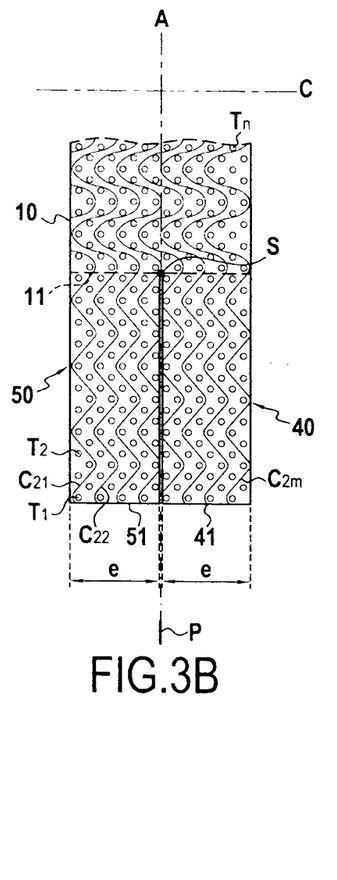
FIG. 3B is a section view on line IIIB-IIIB of FIG. 1B, showing another section of the first portion of the fiber structure of a vane of the invention.

The top portions of FIGS. 3A and 3B are sections in the plane AC (defined by the axes A and C) of the first portion 10.

In FIG. 3A, the weft yarns $T_1$ to $T_n$ (perpendicular to the plane of these figures) are disposed in a staggered configuration, thus defining a plurality of layers. The warp yarns $C_{11}$ to $C_{1m}$ undulate so as to connect together a plurality of said layers. The warp yarns $C_{11}$ to $C_{1m}$ are offset along the axis B so as to enhance the cohesion of the preform.

FIG. 3B is a section in a plane parallel to the section plane of FIG. 3A and offset from said plane along the axis B. It should be observed that the warp yarns $C_{21}$ to $C_{2m}$ are offset along the axis C relative to the warp yarns $C_{11}$ to $C_{1m}$ such that the weft yarns $T_1$ to $T_n$ pass in alternation from one side to the other of the warp yarns. As a result, a preform is woven that presents good cohesion.

For reasons of clarity, the number of warp yarns and of weft yarns shown in FIGS. 3A to 3B has been reduced.

It is specified that the arrangements of the warp yarns and of the weft yarns in FIGS. 3A and 3B serve to illustrate the general principles of weaving a preform of the invention, i.e. the fact that the warp yarns connect together a plurality of superposed layers of weft yarns, and the fact that these connections vary from one plane to another perpendicularly to the direction in which the weft yarns extend. Thus, it can be understood that FIGS. 3A and 3B show merely one possible arrangement of warp/weft yarns among other arrangements that comply with these general weaving principles. Other weaving arrangements in accordance with the invention are thus possible.

At one longitudinal end 11 of the first portion 10, the warp yarns are unlinked so as to create at said longitudinal end 11 a first projection of 3D fiber structure and a second projection of 3D fiber structure. This separation of the first portion 10 of the fiber structure into two projections takes place solely by unlinking the yarns, without cutting any yarns, as explained below. Thus, the structural integrity of the preform 1 is conserved.

Thereafter, each of these projections continues to be woven separately so as to extend the first projection as a first layer 40 of the 3D fiber structure and so as to extend the second projection as a second layer 50 of 3D structure. The first layer 40 and the second layer 50 are separated by a plane P defined by the longitudinal axis A and the transverse axis B. The location where the first layer 40 and the second layer 50 join together is a segment S, parallel to the axis B and contained in the plane P. The first layer 40 and the second layer 50 are of thicknesses (along the axis C) that are substantially equal, such that the plane P is situated halfway through the thickness of the first portion 10. Each of the first and second layers 40 and 50 presents a thickness e equal to half the thickness of the first portion 10.

The bottom portions of FIGS. 3A and 3B show the principle of this unlinking of the warp yarns. Beneath the segment S, the amplitude of the undulations of the warp yarns is reduced, such that none of these warp yarns crosses the plane P. It can thus be understood that it is necessary to use two weft yarn shuttles, each shuttle weaving a respective one of the first and second layers 40 and 50.

The first layer 40 continues to be woven in such a manner as to be extended along the longitudinal axis A over a certain distance from the segment S over the entire width of the first portion 10 along the axis B and beyond the front edge 15 along the axis B so that the preform 1 presents an L-shape in the plane P. The first layer 40 is thus terminated in the direction of the longitudinal axis A by a first face 41 that extends along the transverse axis B, and by a second face 42 that extends along the longitudinal axis A from the first face 41 to the line extending the segment S. The end of the first layer 40 is thus bordered in the plane P by three sides: the first face 41, the second face 42, and a face $F_{41}$ parallel to the first face 41 and situated so as to extend the segment S. The face $F_{41}$ thus extends from the second face 42 to the proximity of the front edge 15.

The weft yarns of the first layer 40 thus extend from the rear edge 16 to the second face 42.

In similar manner, the second layer 50 continues to be woven in such a manner as to form a layer having the same shape as the first layer 40 and facing said first layer. This second layer 50 is thus initially extended along the longitudinal axis A to a first face 51 in the same plane as the first face 41, over the entire width of the first portion 10 and beyond in the direction of the transverse axis B until it reaches the second face 42 of the first layer 40, thereby defining a second face 52 in the same plane as said second face 42.

This second face 52 extends along the longitudinal axis A from the first face 51 to the level of the line extending the segment S. The end of the second layer 50 is thus bordered in the plane P by three sides: the first face 51, the second face 52, and a face $F_{51}$ coplanar with the face $F_{41}$.

The weft yarns of the second layer 50 thus extend from the rear edge 16 to the second face 52.

This produces the vane as shown in FIG. 1A.

Figure 1B:
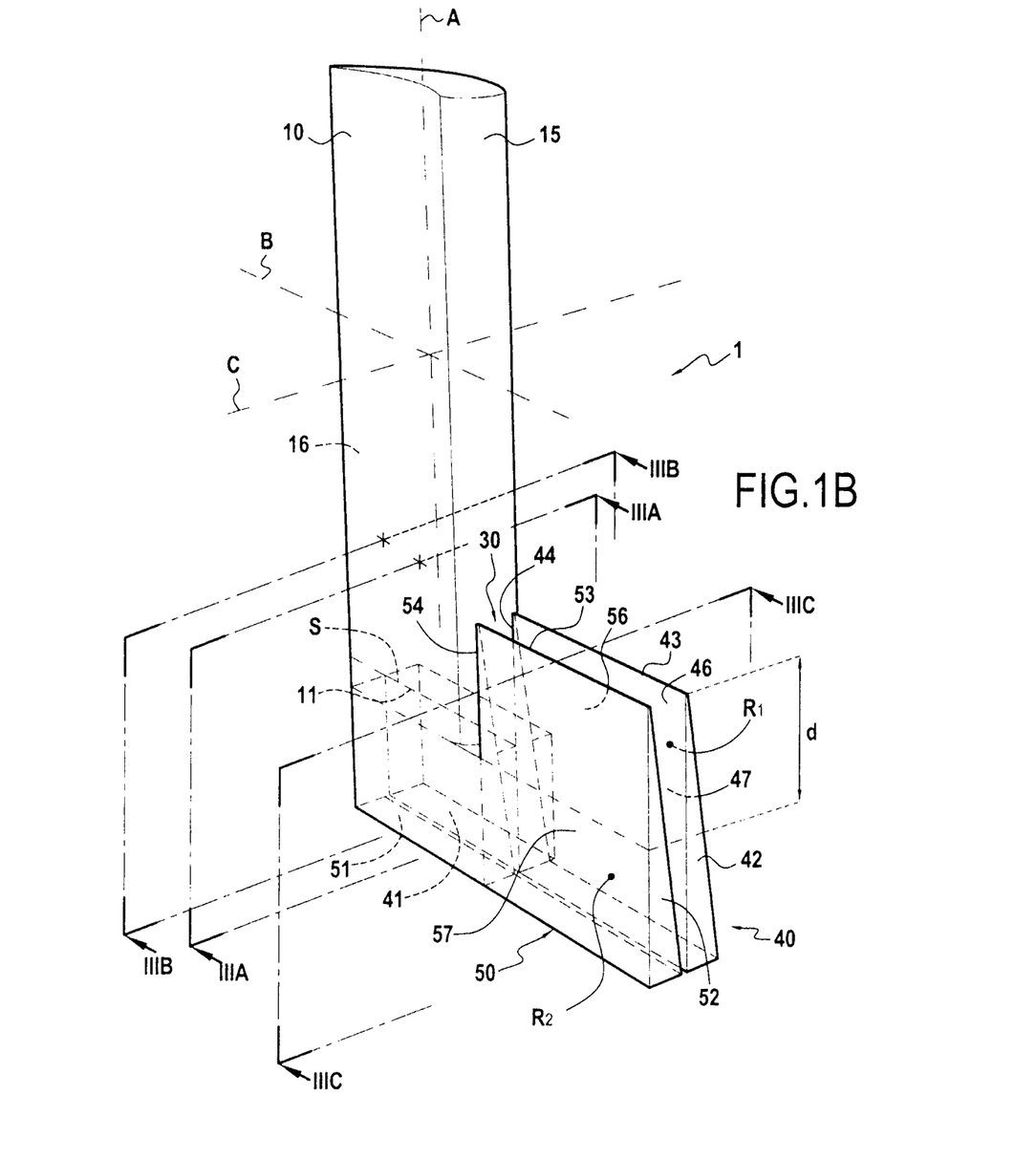
FIG. 1B is a diagrammatic perspective view of the fiber structure of a vane of the invention, prior to folding.

Thereafter, the first layer 40 is extended from the face $F_{41}$ along the direction of the longitudinal axis A so that the preform 1 presents a J-shape in the plane P. This extension is performed through a distance d that is substantially equal to the distance between the segment S and the first face 41.

Thus, the end of the first layer 40 is now bordered in the plane P by three sides: the second face 42, a third face 43 that extends parallel to the old face $F_{41}$ from the second face 42 to the proximity of the front edge 15, and a fourth face 44 that extends to immediately in front of the front edge 15, parallel to the second face 42, from the old face $F_{41}$ up to a third face 43 (see FIG. 1B).

In practice, the first layer 40 is extended from the face $F_{41}$ by using warp yarns that extend from the first face 41 as far as the third face 43. The shuttle for the warp yarns at the end of the first layer 40 thus performs go-and-return movements between the fourth face 44 and the second face 42, without meeting the weft yarns of the first portion 10 of the vane.

Thus, with the plane Q being defined as being perpendicular to the axis B and situated immediately in front of the front edge 15 (see FIG. 1A), the weft yarns at the end of the first layer 40 do not pass through the plane Q.

In similar manner, the second layer 50 continues to be woven so as to form a layer having the same shape as the first layer 40 and facing said first layer. Thus, the end of the second layer 50 is bordered in the plane P by three sides: a second face 52 coplanar with the second face 42 of the first layer 40, a third face 53 coplanar with the third face 43 of the first layer 40, and a fourth face 54 coplanar with the fourth face 44 of the first layer 40 (see FIG. 1B).

In practice, the second layer 50 is extended from the face $F_{51}$ using warp yarns that extend from the first face 51 as far as the third face 53. The shuttle for the warp yarns thus performs go-and-return movements between the fourth face 54 and the second face 52, without passing through the plane Q.

The first layer 40 and the second layer 50 constitute the second portion 20 of the preform 1 that is to form the platform of the guide vane. The space defined by the front edge 15 and the fourth faces 44 and 54 forms a channel 30 that separates the second portion 20 from the first portion 10. The region of the first layer 40 in front of the plane Q and defined by the first face 41, the second face 42, the third face 43, and the fourth face 44, constitute the first region $R_1$.

The region of the second layer 50 in front of the plane Q and defined by the first face 51, the second face 52, the third face 53, and the fourth face 54, constitutes the second region $R_2$.

The first region $R_1$ and the second region $R_2$ are designed to overlap in full so as to reconstitute a portion of the platform in front of the front edge 15 of the airfoil, as explained below.

The platform must be of constant thickness, so it is necessary for the thicknesses of the first region $R_1$ and of the second region $R_2$ to vary.

Thus, the thickness of the first region $R_1$ diminishes linearly from the thickness e at the first face 41 to an almost zero thickness at the third face 43.

The face of the first region $R_1$ that faces the second region $R_2$, i.e. its face in the plane P, is referred to as the first inside face 46. The face of the first region $R_1$ that is opposite from the first inside face 46 is referred to as the first outside face 47. The reduction in the thickness of the first region $R_1$ is achieved by the first outside face 47 approaching the plane P. The first inside face 46 remains in the plane P, perpendicular to the first face 41. The shape of the first region $R_1$ is shown in FIG. 1B.

Figures 3C, 4:
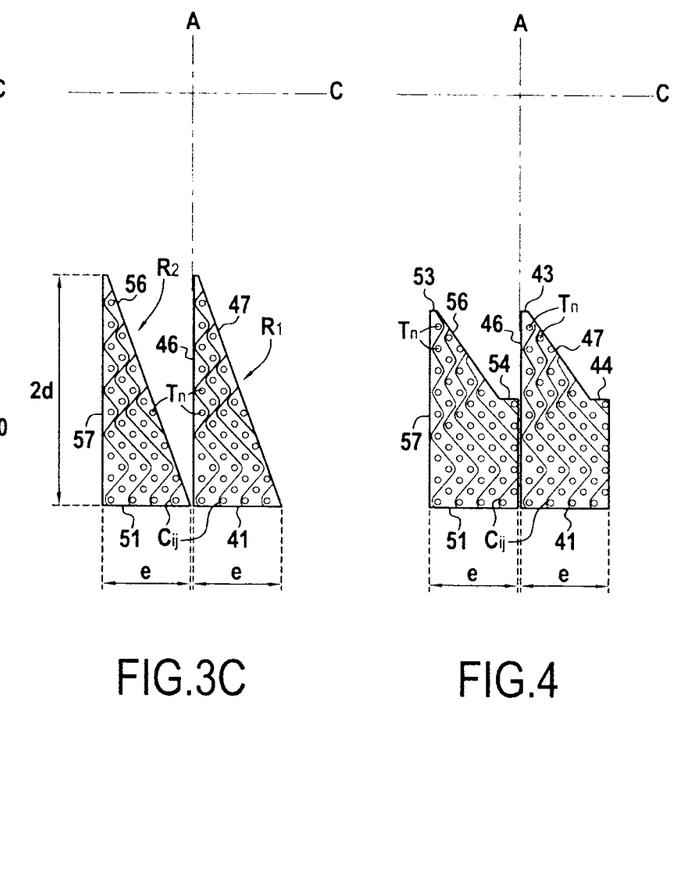
FIG. 3C is a section view on line IIIC-IIIC of FIG. 1B, showing a section of the second portion of the fiber structure of a vane of the invention.
FIG. 4 is a section view on line IV-IV of FIG. 2C, showing a section of the second portion of the fiber structure of another embodiment of a vane of the invention.

This substantially linear reduction in thickness is thus obtained by unlinking using a method known to the person skilled in the art (an example of such a method is described in European patent application EP 1 526 285). The amplitude of the warp yarn $C_{ij}$ is reduced progressively on going from the first face 41 towards the third face 43 so that the warp yarns cross fewer layers of weft yarns $T_n$. Simultaneously, the number of go-and-return movements of the warp yarn shuttle is reduced. This situation is shown in FIG. 3C which is a section of the first region $R_1$ in section plane AC.

This reduction in thickness implies that the thickness of the preform varies in the plane Q on going along the axis B from the region of the first layer 40 situated in line with the airfoil (first portion 10) to the first region $R_1$. Parallel to the plane Q, the region of the first layer 40 situated extending the airfoil is of rectangular section, whereas the first region $R_1$ is of trapezoidal section. The variation in the thickness of the first layer 40 in the plane Q defines a first rim 45 parallel to the second face 42 (see FIG. 1A). This reduction of thickness is obtained by unlinking: the amplitude of the warp yarns is reduced beside the plane Q, and the weft yarns coming from the region of the first layer 40 situated to extend the airfoil return to behind the level of the plane Q in order to define the first rim 45.

In similar manner, the thickness of the second region $R_2$ decreases linearly from the thickness e of the first face 51 to an almost zero thickness in the third face 53. The face of the second region $R_2$ that faces the first region $R_1$ is referred to as the second inside face 56. The face of the second region $R_2$ that is opposite from the second inside face 56 is referred to as the second outside face 57. The thickness of the first region $R_1$ is reduced by causing the second inside face 56 to come closer to the second outside face 57. The second outside face 57 remains in a plane parallel to the plane P, perpendicular to the first face 51. The shape of the second region $R_2$ is shown in FIG. 1B.

This substantially linear reduction in thickness is thus obtained by unlinking, as for the first region $R_1$. The amplitude of the warp yarns $C_{ij}$ is reduced progressively on going from the first face 51 towards the second face 53 so that the warp yarns cross fewer layers of weft yarns $T_n$. Simultaneously, the number of go-and-return movements of the weft yarn shuttle is reduced. This situation is shown in FIG. 3C which is a section of the second region $R_2$ in section plane AC.

This reduction of thickness implies that the preform is of thickness that varies in the plane Q on going along the axis B from the region of the second layer 50 situated extending the airfoil (first portion 10) to the second region $R_2$. The variation in thickness of the second layer 50 in the plane Q defines a second rim 55 parallel to the second face 52 (see FIG. 1A). This reduction in thickness is obtained by unlinking, in similar manner to the unlinking of the first region $R_1$.

FIG. 1B shows the finished vane, prior to being folded.

Figure 1C:
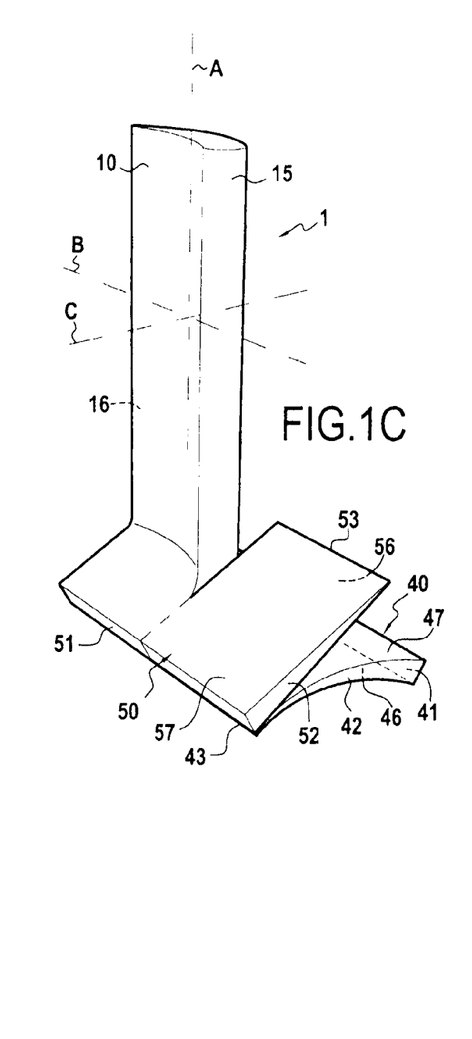
FIG. 1C is a diagrammatic perspective view of the fiber structure of a vane of the invention while it is being folded.

The following step in the method of fabricating the guide vane consists in folding the first and second layers 40 and 50 as described below.

The first layer 40 is pivoted about the segment S so that the first edge 41 removes away from the plane P, until the first layer 40 lies in a plane perpendicular to the first portion 10, i.e. a plane defined by the transverse axis B and the thickness axis C. One-half of the first region $R_1$ (the half defined by the old face $F_{41}$, the second face 42, the third face 43, and the fourth face 44) thus passes to the other side of the first portion 10 (i.e. the other side of the plane defined by the axes A and B).

Similarly, the second layer 50 is pivoted about the segment S so as to move the first edge 51 away from the plane P, i.e. it is pivoted in the opposite direction of rotation to the first layer 40, until the second layer 50 lies in a plane perpendicular to the first portion 10, i.e. in the same plane as now contains the first layer 40. One-half of the second region $R_2$ (the half defined by the old face $F_{51}$, the second face 52, the third face 53, and the fourth face 54) thus passes to the other side of the first portion 10.

The segment S thus acts as a hinge about which the first and second layers 40 and 50 pivot in mutually opposite directions through an angle having an amplitude of 90°. FIG. 1C shows the first layer 40 and the second layer 50 at an intermediate stage during pivoting.

Figure 1D:
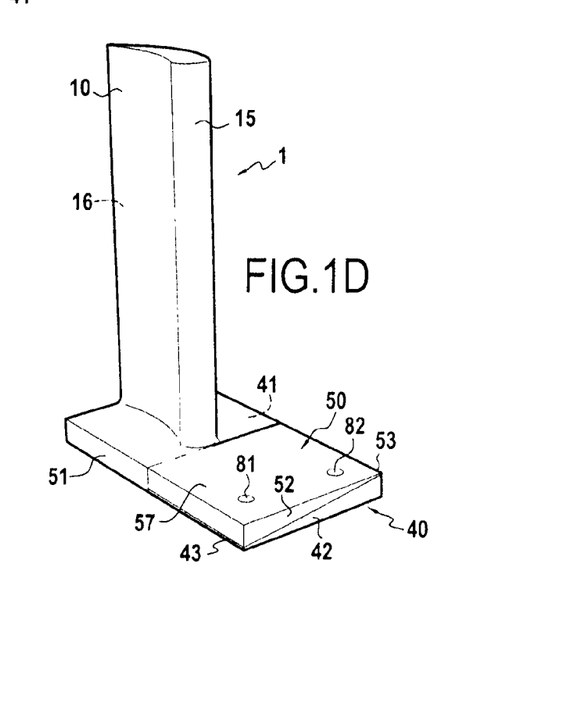
FIG. 1D is a diagrammatic perspective view of the fiber structure of a vane of the invention, after folding.

It can thus be understood that at the end of the pivoting process, the first region $R_1$ of the first layer 40 faces the second region $R_2$ of the second layer 50 in the plane defined by the transverse axis B and the thickness axis C. As a result, the first layer 40 and the second layer 50 overlie each other over the extent of the first and second regions $R_1$ and $R_2$ so as to form a new layer of thickness e, as shown in FIG. 1D. The outside face 47 is thus completely in contact with the inside face 56. The fourth face 44 is thus in contact with the second rim 55, and the fourth face 54 is in contact with the first rim 45.

By analogy with FIGS. 1A to 1D, FIGS. 2A to 2E show steps of the method of fabricating a guide vane in another implementation of the invention.

Figure 2A:
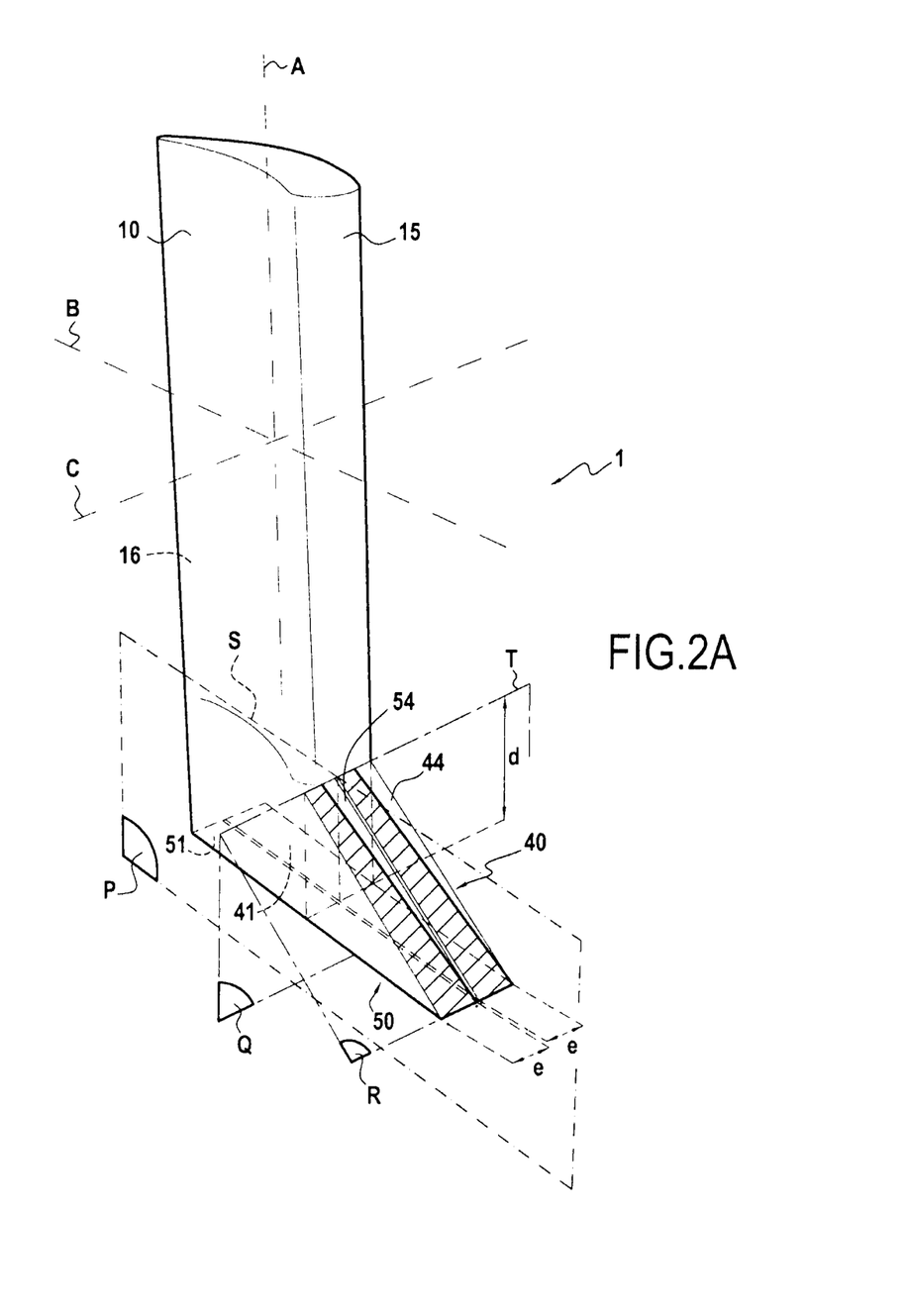
FIG. 2A is a diagrammatic perspective view of the fiber structure of another embodiment of a vane of the invention, while partially constructed.

As shown in FIG. 2A, the weaving of the first portion 10 of both the first layer 40 and the second layer 50 as far as the plane Q, and the unlinking of the first and second layers 40 and 50 are performed in identical manner to that described for the implementation shown in FIG. 1A.

FIGS. 3A and 3B thus apply equally to the present implementation.

Figure 2B:
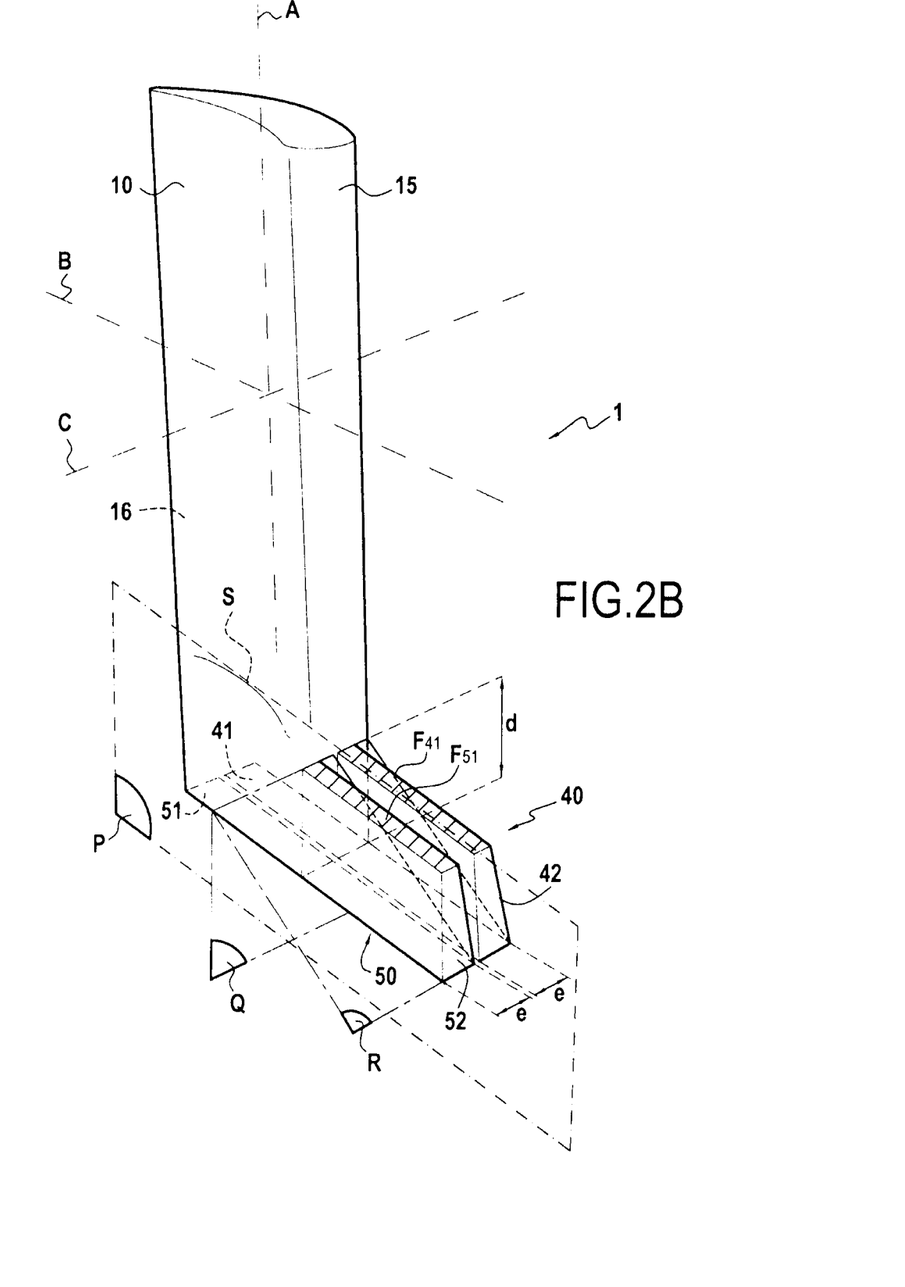
FIG. 2B is a diagrammatic perspective view of the fiber structure of another embodiment of a vane of the invention, while partially constructed.

Thus, the first layer 40 continues to be woven so as to be extended along the longitudinal axis A over a certain distance from the segment S over the entire width of the first portion 10 along the axis B and beyond the plane Q along the axis B, so that the preform 1 has an L-shape in the plane P. The first layer 40 is thus terminated in the direction of the longitudinal axis A by a first face 41 that extends along the transverse axis B, and by a second face 42 that extends along the longitudinal axis A from the first face 41 to the level of the line that extends the segment S, as can be seen in FIG. 2B. The end of the first layer 40 is thus bordered in the plane P by three sides: the first face 41, the second face 42, and a face $F_{41}$ parallel to the first face 41 and extending the segment S. The face $F_{41}$ thus extends from the second face 42 to the proximity of the front edge 15. The weft yarns of the first layer 40 thus extend from the rear edge 16 to the second face 42.

In similar manner, the second layer 50 continues to be woven like the first layer 40 so that the preform 1 has an L-shape in the plane P. The second layer 50 thus terminates in the direction of the longitudinal axis A in a first face 51 occupying the same plane as the first face 41 over the entire width of the first portion 10 and beyond in the direction of the transverse axis B as far as the level of the second face 42 of the first layer 40, thus defining a second face 52 in the same plane as the second face 42.

This second face 52 extends along the longitudinal axis A from the first face 51 to the level of the line extending the segment S.

The end of the second layer 50 is thus bordered in the plane P by three sides: the first face 51, the second face 52, and a face $F_{51}$ parallel to the first face 51 and extending the segment S. The face $F_{51}$ thus extends from the second face 52 to the proximity of the front edge 15. The weft yarns of the second layer 50 thus extend from the rear edge 16 to the second face 52.

This produces the vane as shown in FIG. 2B.

Nevertheless, unlike the implementation shown in FIGS. 1A to 1D, the first layer 40 is subjected to variation in its thickness not in the plane Q, but in a plane R that is defined as follows: the plane R is obtained by pivoting the plane Q about an axis T parallel to the axis C that is contained in the plane Q, and that intersects the segment S. This plane R is inclined relative to the plane Q in such a manner that it contains the intersection segment between the first face 41 and the second face 42. The region of the first layer 40 situated between the plane Q, the plane R, and the face 42 thus forms a right-angle triangle in the plane P with its hypotenuse lying in the plane R (see FIG. 2A).

The variation of thickness in the plane R is described below. On the face of the plane R beside the first face 41, the first layer 40 is substantially rectangular in section and of uniform thickness equal to e. The rectangle of this section has one side of length e along the axis T and an opposite side of length e along the intersection segment of the first and second faces 41 and 42. These two sides are connected by one side lying in the plane P and by a side that is parallel thereto. On the other face of the plane R, the first layer 40 is of trapezoidal section, the trapezoid forming this section being defined as follows: it shares with the rectangle (of the section on the other face of the plane R) its side of length e along the intersection segment of the first and second faces 41 and 42, and its side that is situated in the plane P. Along the axis T, the trapezoid has a side of length equal to e/2, which side is connected to the opposite side via an oblique side. The trapezoid thus has width along the axis C that varies linearly between e and e/2.

The variation in the thickness of the first layer 40 in the plane R is thus at its maximum and equal to e/2 on the axis T, and is equal to zero at the second face 42. The variation in thickness of the first layer 40 in the plane R defines a first rim 44 (see FIG. 2A). This variation in thickness is obtained by unlinking: the amplitude of the warp yarns $C_{ij}$ coming from the first face 41 is reduced on passing through the plane R so that the warp yarns pass through fewer layers of weft yarns $T_n$. Simultaneously, the weft yarns coming from the region of the first layer 40 situated extending the airfoil come back at the plane R so as to define the first rim 45. This situation is shown in FIG. 4 which is a section of the first layer 40 in section plane AC.

In similar manner, the second layer 50 is subject to a variation in thickness in a plane R, going from a rectangular section to a trapezoidal section. The trapezoid forming this section is defined as follows: in common with the rectangle (of the section on the other face of the plane R) it shares its side of length e at the intersection segment between the first and second faces 51 and 52, and its side opposite to the side situated in the plane P. Along the axis T, the trapezoid has a side of length equal to e/2, which side is connected to the opposite side by an oblique side. The trapezoid thus has width along the axis C that varies linearly between e and e/2. The trapezoid of the second layer 50 and the trapezoid of the first layer 40 are thus superposable.

The variation in thickness of the second layer 50 in the plane R defines a second rim 54 (see FIG. 2A). This reduction in thickness is obtained by unlinking, as with the first layer 40. This situation is shown in FIG. 4, which shows a section of the second layer 50 in section plane AC.

Starting from the face $F_{41}$, the first layer 40 is then extended by weaving along the direction of the longitudinal axis A so that the preform 1 presents a J-shape in the plane P. The distance through which the first layer 40 is extended along the axis A from the face $F_{41}$ varies linearly between the end of the face $F_{41}$ situated at the segment T and the opposite end of the face $F_{41}$ (at the second face 42). Thus, the first layer 40 is not extended at the segment T, and it is extended at the second face 42 through a distance d. The distance d is the distance between the face $F_{41}$ and the first face 41. The end of the first layer 40 is thus defined by a third face 43 that extends from the second face 42 to the segment T. The face $F_{41}$, the second face 42, and the third face 43 define a right-angled triangle in the plane P with its hypotenuse being constituted by the third face 43.

In practice, the first layer 40 is extended from the first face $F_{41}$ by using warp yarns that extend from the first face 41 to the third face 43. The warp yarn shuttle for the end of the first layer 40 thus performs go-and-return movements between the third face 43 and the second face 42.

In similar manner, the second layer 50 continues to be woven from the face $F_{51}$ along the direction of the longitudinal axis A so as to form a layer having the same shape as the first layer 40 and facing said first layer. Thus, the second layer 50 is not extended at the segment T, and is extended from the first face 52 through a distance d. The end of the second layer 50 is defined by a third face 53 that extends from the second face 52 to the segment T. The face $F_{51}$, the second face 52, and the third face 53 thus define a right-angled triangle in a plane parallel to the plane P and having its hypotenuse constituted by the third face 53.

The second layer 50 is extended from the face $F_{51}$ by weaving in manner identical to that used for the first layer 40.

The first layer 40 and the second layer 50 constitute the second portion 20 of the preform 1 that serves to form the platform of the guide vane.

The region of the first layer 40 defined by the plane R, the second face 42, and the third face 43 constitutes a first region $R_1$.

The region of the second layer 50 defined by the plane R, the second face 52, and the third face 53, constitutes the second region $R_2$.

The first and second regions $R_1$ and $R_2$ are designed to overlap in full, thereby contributing to constituting the portion of the platform ahead of the front edge 15 of the airfoil, as explained below.

Figure 2C:
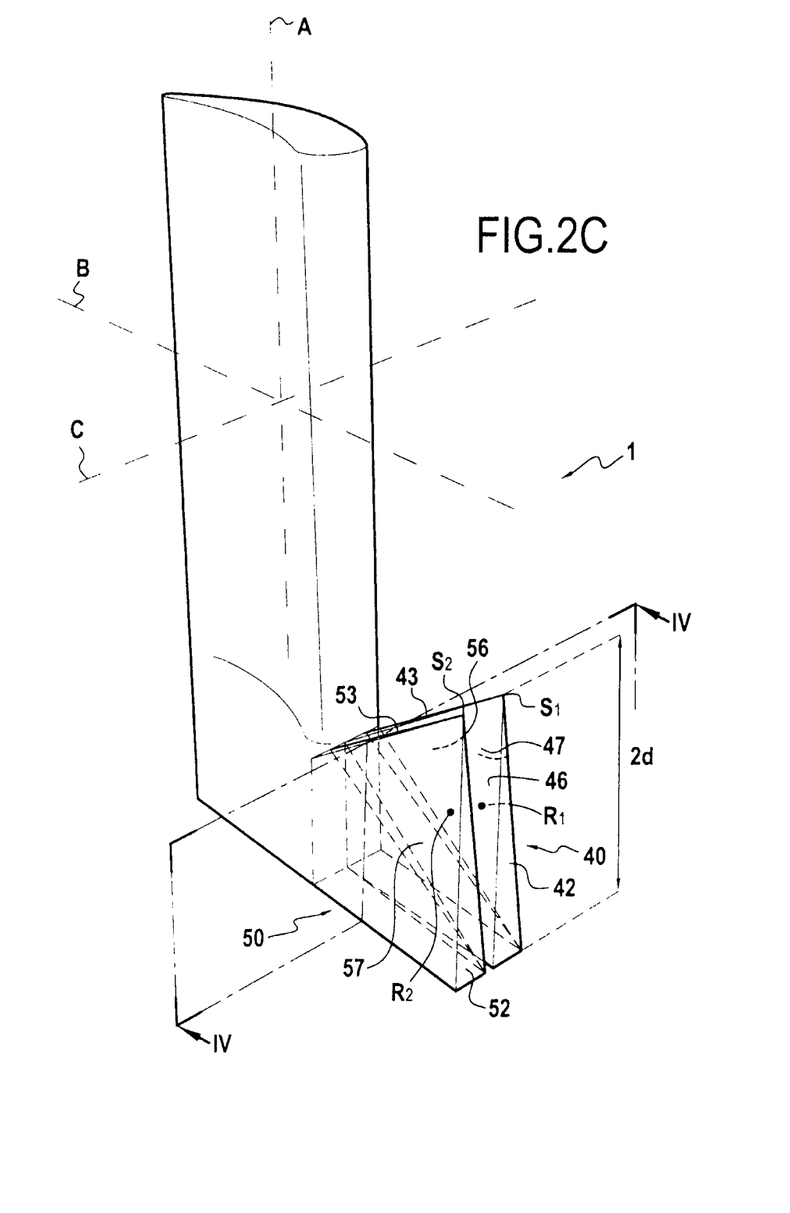
FIG. 2C is a diagrammatic perspective view of the fiber structure of another embodiment of a vane of the invention, prior to being folded.

The platform needs to be of constant thickness, so it is necessary for the thickness of the first region $R_1$ and the thickness of the second region $R_2$ to vary, as explained below.

The face of the first region $R_1$ that faces the second region $R_2$, i.e. the face lying in the plane P, is referred to as the first inside face 46. The face of the second region $R_1$ that is opposite from the first inside face 46 is referred to as the first outside face 47.

The thickness of the first region $R_1$ along the second face 42 diminishes linearly from the thickness e (at the first face 41), to a thickness that is nearly zero at a distance 2×d measured along the axis A from the first face 41. The second face 42 is thus a triangle.

The thickness of the first region $R_1$ along the third face 43 diminishes linearly from a thickness substantially equal to e/2 at the segment T to a thickness that is nearly zero at the location where the third face 43 joins the second face 42. The third face 43 is thus a triangle, and one of its vertices is common with a vertex of the second face 42. This vertex is referred to as $S_1$.

The second face 42, the third face 43, the first inside face 46, and the first outside face 47 thus form a pyramid of trapezoidal base that is situated in the plane R, and of apex $S_1$. The shape of the first region $R_1$ is shown in FIG. 2C.

The substantially linear reduction in the thickness of the first region $R_1$ is obtained by unlinking. The amplitude of the warp yarns $C_{ij}$ is decreased on going from the plane R towards the third face 53 in such a manner that the warp yarns cross fewer layers of weft yarns $T_n$. Simultaneously, the number of go-and-return movements of the weft yarn shuttle is reduced. This situation is shown in FIG. 4, which is a section of the first region $R_1$ in section plane AC.

The thickness of the second region $R_2$ varies identically to the thickness of the first region $R_1$.

The face of the second region $R_2$ that faces the first region $R_1$ is referred to as the second inside face 56. The face of the second region $R_2$ that is opposite from the second inside face 56 is referred to as the second outside face 57. The second outside face 57 lies in a plane parallel to the plane P, perpendicular to the first face 41.

The thickness of the second region $R_2$ along the second face 52 diminishes linearly from the thickness e (at the first face 51), to a thickness that is nearly zero at a distance 2×d measured along the axis A from the first face 51. The second face 52 is thus a triangle.

The thickness of the second region $R_2$ along the third face 53 diminishes linearly from a thickness substantially equal to e/2 at the segment T, to a thickness that is nearly zero at the location where the third face 53 joins the second face 52. The third face 53 is thus a triangle with one of its vertices in common with a vertex of the second face 52. This vertex is referred to as $S_2$.

The second face 52, the third face 53, the second inside face 56, and the second outside 57 thus form a pyramid on a trapezoidal base lying in the plane R and having its apex at $S_2$. The shape of the second region $R_2$ is shown in FIG. 2C.

The substantially linear reduction in the thickness of the second region $R_2$ is obtained by unlinking, as for the first region $R_1$. This situation is shown in FIG. 4, which shows a section on the second region $R_2$ in section plane AC.

FIG. 2C shows the finished vane before folding.

Figure 2D:
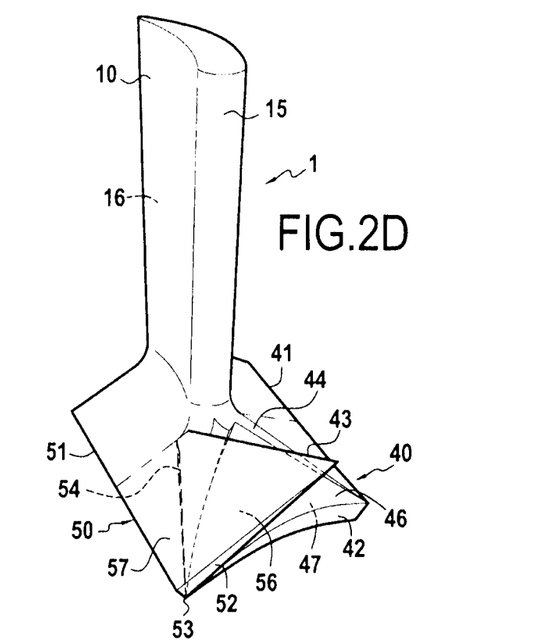
FIG. 2D is a diagrammatic perspective view of the fiber structure of another embodiment of a vane of the invention, while it is being folded.
Figure 2E:
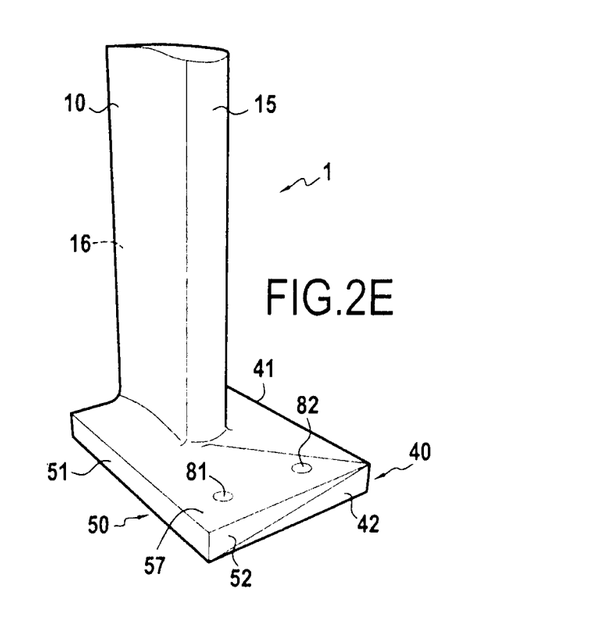
FIG. 2E is a diagrammatic perspective view of the fiber structure of another embodiment of a vane of the invention, after folding.

The following step in the method of fabricating the guide vane consists in folding the first and second layers 40 and 50 as described below.

The first layer 40 is caused to pivot about the segment S to move the first edge 41 away from the plane P, until the second layer 40 is situated in a plane perpendicular to the first portion 10 and to the axis A, i.e. a plane defined by the transverse axis B and the thickness axis C. Half of the first region $R_1$ (the half defined by the old face $F_{41}$, the second face 42, and the third face 43) thus passes to the other side of the first portion 10 (i.e. to the other side of the plane P defined by the axes A and B).

In similar manner, the second layer 50 is caused to pivot about the segment S so as to move the first edge 51 away from the plane P, i.e. in a pivot direction opposite to the pivot direction of the first layer 40, until the second layer 50 lies in a plane perpendicular to the first portion 10, i.e. in the same plane as now contains the first layer 40. One-half of the second region $R_2$ (the half defined by the old face $F_{51}$, the second face 52, and the third face 53) thus passes to the other side of the plane P.

The segment S thus acts as a hinge about which the first and second layers 40 and 50 pivot in mutually opposite directions through respective angles, each having an amplitude of 90°. These two layers thus occupy a symmetrical position relative to the first portion 10.

FIG. 2D shows the first layer 40 and the second layer 50 at an intermediate stage of their pivoting.

It can be understood that at the end of this pivoting process, the first region $R_1$ of the second layer 40 faces the second region $R_2$ of the second layer 50 in the plane defined by the transverse axis B and the thickness axis C. As a result, the first layer 40 and the second layer 50 overlie each other over the extent of the first and second regions $R_1$ and $R_2$ so as to form a new layer of thickness e, as shown in FIG. 2D. The first outside face 47 is thus fully in contact with the second inside face 56. The third face 43 of the first layer 40 is thus fully in contact with the second rim 54, and the third face 53 of the second layer 50 is thus fully in contact with the first rim 44.

In both above-described implementations, the first region $R_1$ comes into contact with the second region $R_2$ essentially in the plane containing the inside face 56 and the outside face 47. The surface where the first layer 40 covers the second layer 50 is thus essentially plane.

Alternatively, the first region $R_1$ and the second region $R_2$ may cover each other with the thicknesses of these regions varying in non-linear manner (e.g. stepwise), providing the sum of the thicknesses of these regions remains substantially equal all along any axis parallel to the axis A. Thus, the thickness of this zone where the first region $R_1$ covers the second region $R_2$ is substantially equal to the (maximum) thickness of the first layer 40 or of the second layer 50, such that the thickness of the platform that is made from the second portion 20 of the fiber structure is substantially constant.

Once the preform has been conformed in this way so as to have a shape that is substantially close to its final shape (i.e. a shape where the platform constituted by the first layer 40 and the second layer 50 is substantially perpendicular to the airfoil 10), this preform is placed in a mold of shape that corresponds to the final shape. The preform is then densified using one of the above-mentioned known techniques (impregnation by a liquid, or chemical vapor infiltration).

An implementation is described above in which the first region $R_1$ of the first layer 40 covers the second region $R_2$ of the second layer 50 over a zone that is substantially rectangular constituting all of the portion of the platform that is situated in front of the front edge 15 of the airfoil.

An implementation is also described in which the first region $R_1$ of the first layer 40 covers the second region $R_2$ of the second layer 50 over a zone that is substantially triangular, flaring away from the front edge 15 of the airfoil in a forward direction.

In general manner, the invention relates to a vane in which a first region $R_1$ of the first layer 40 covers a second region $R_2$ of the second layer 50 in front of the front edge 15 of the airfoil. The first and second layers 40 and 50 are of substantially identical volume and shape.

Alternatively, the first layer 40 and the second layer 50 may be of different volumes or shapes.

In the above description, one technique of 3D weaving is described for making the preform constituting the vane of the invention. Other 3D weaving techniques could equally well be used, providing the preform is obtained with the same shape.

Before the densification operation, it is possible to make two holes 81 and 82 of axis A in the preform made up as described above, the holes passing through the first and second regions $R_1$ and $R_2$ and being situated on either side of the plane P (FIG. 1D and FIG. 2D) ahead of the front edge 15 of the airfoil. By way of example, each of these holes may be made by spacing apart the fibers of the preform by means of a cylinder of diameter equal to the diameter of the hole, or by weaving around such a cylinder. The preform and the cylinders are then placed in the mold before the densification operation in such a manner that the vane includes two holes at the locations of these cylinders in its platform. The holes 81 and 82 are for receiving bolts that enable the vane to be secured mechanically to its support.

Advantageously, the holes 81 and 82 are positioned in such a manner that each of them passes both through the first layer 40 and through the second layer 50 (i.e. each of them passes through the first region $R_1$ and the second region $R_2$). Thus, the bolts (or any other mechanical fastener device) passing through these holes contribute to holding the first and second layers 40 and 50 together, in addition to securing the platform to its support.

Producing the preform 1 with a first layer 40 and a second layer 50 at the longitudinal end 11 of the first portion 10, in the manner described above, may also be performed at the other longitudinal end of the preform 1. Thus, prior to conforming the preform 1 in the mold, a third portion is made in similar to the second portion 20 but situated at the other longitudinal end of the first portion 10, in order to form another platform. This modified preform is then placed in a mold that is suitable for receiving it, and it is then densified with a polymer matrix.

In FIGS. 1A to 1D and 2A to 2E, the first portion 10 is shown as being curved about the axis A. In general, the first portion 10 may be of more complex shape (curvature about a plurality of axes), depending on the shape desired for its airfoil.

In certain applications, the first portion 10 includes a metal leading edge that is fitted to the front edge 15.

The invention also provides a turbomachine including at least one guide vane of the invention.

The invention claimed is:

1. A method of fabricating a guide vane, the method comprising:
   a) producing a fiber preform by 3D weaving a single piece, the preform comprising a first portion extending along the longitudinal axis and constituting the preform for the airfoil of the vane, and at a longitudinal end of the first portion, a second portion constituting the preform for the platform of the vane, the second portion being produced as a first layer and a second layer facing the first layer and separated from the first layer by unlinking without cutting while producing the preform;
   b) folding the first and second layers such that each of them lies in a plane perpendicular to the longitudinal axis, substantially symmetrically to each other relative to the first portion, and such that a first region of the first layer covers a second region of the second layer in front of a front edge of the first portion;
   c) conforming the preform in a mold; and
   d) densifying the preform with a polymer matrix.

2. A method according to claim 1, wherein the first layer and the second layer are substantially identical in volume and shape.

3. A method according to claim 1, wherein the fiber preform of the first layer is cambered in a zone adjacent to the first portion, and the fiber preform of the second layer is cambered in a zone adjacent to the first portion such that the zone of the first layer and the zone of the second layer that are adjacent to the first portion tend to take up symmetrical positions on respective sides relative to the first portion under influence of the cambering.

4. A method according to claim 1, wherein prior to conforming the preform in the mold, a third portion situated at the other longitudinal end of the first portion is made in a manner similar to the second portion for purpose of forming another platform.

5. A method according to claim 1, wherein the first portion includes a metal leading edge fitted on the front edge.

6. A guide vane made of composite material comprising a polymer matrix reinforced by a fiber structure, the vane comprising:
   an airfoil-forming first portion and a second portion situated at a longitudinal end of the first portion and forming a platform extending in a plane substantially perpendicular to the airfoil,
   wherein all of the fiber elements forming the fiber structure are continuous, and the region of the fiber structure forming the second portion includes a first layer extending in the plane on one side of the airfoil and in front of a front edge of the airfoil, and a second layer extending in the plane on one side of the airfoil and in front of the front edge of the substantially symmetrically to the first layer relative to the airfoil, such that a first region of the first layer covers a second region of the second layer in front of the front edge.

7. A guide vane according to claim 6, wherein the first layer and the second layer are substantially identical in volume and shape.

8. A guide vane according to claim 6, wherein the first region of the first layer covers the second region of the second layer over a zone that is substantially rectangular, constituting all of the portion of the platform that is situated in front of the front edge of the airfoil.

9. A guide vane according to claim 6, wherein the first region of the first layer covers the second region of the second layer over a zone that is substantially triangular, flaring forwards from the front edge of the airfoil.

10. A guide vane according to claim 6, wherein the surface where the first layer covers the second layer is substantially plane.

11. A guide vane according to claim 6, further comprising a third portion similar to the second portion and situated at the other longitudinal end of the first portion, the third portion serving to form another platform.

12. A guide vane according to claim 6, wherein the airfoil includes a metal leading edge fitted on the front edge.

13. A turbomachine including at least one guide vane according to claim 6.

* * * * *